A. J. ROGERS.
Seed Planter.
No 28,777.
Patented June 19, 1860.
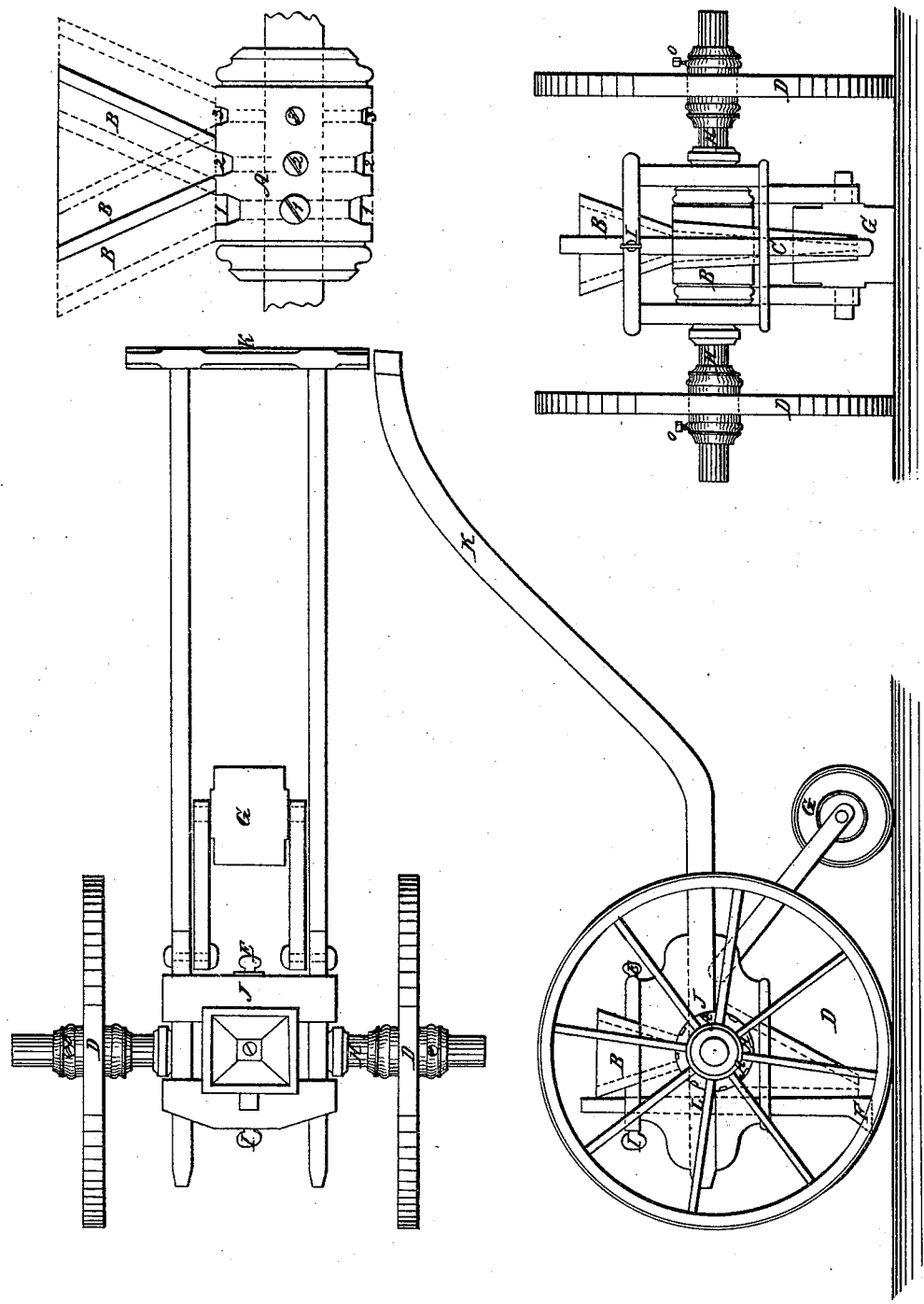

UNITED STATES PATENT OFFICE.

ALONZO J. ROGERS, OF STEPHENTOWN, NEW YORK.

IMPROVEMENT IN SEED-PLANTERS.

Specification forming part of Letters Patent No. 28,777, dated June 19, 1860.

*To all whom it may concern:*

Be it known that I, ALONZO J. ROGERS, of Stephentown, in the county of Rensselaer and State of New York, have invented, made, and applied to use certain new and useful Improvements in Seed-Planters; and I do hereby declare the following to be a full, clear, and exact description of the same, reference being had to the accompanying drawings, and to the letters of reference marked therein, in which—

Figure I is a side view of my improved seed-planter; Fig. II, a top view of the same; Fig. III, a view of the cylinder and hopper employed by me; Fig. IV, a front end view of my improved seed-planter.

In the drawings similar parts of the invention are designated by the same letters.

To enable others skilled in the art to make and use my invention, I will proceed to describe its construction and operation.

I provide an axle, H, to which I attach two wheels, D D, the position of which is regulated by set-screws $o$ $o$, as shown in model, and which wheels are adjusted to enable the sowing of seeds at a greater or less distance from each other. To this axle H, I fasten a cylinder, A, for the purpose of conducting the seed from the hopper B to the conductor C, through which the seed passes into the ground, and which cylinder A revolves with the wheels D D. This cylinder A is provided with a series of cavities, 1 2 3, which cavities 1 2 3 are graduated by means of screws to regulate the quantity of seed sown. These cavities 1 2 3 are also made of different sizes to accommodate different-sized seeds, and are placed at a sufficient distance from each other to allow proper space between the seeds sown.

Directly above the cylinder A is placed the hopper B, held in position by set-screw E. The position of the hopper B may be adjusted to bring the hopper B in a direct line with any particular row of cavities 1 by means of the screw E, in conjunction with slot in cross-piece, as shown in model.

To the frame-work J, through which the axle H passes, is attached the handle K, and to the cross-piece L, directly upon the front of the machine, the plow F, regulated by means of the screw I, is attached, which drills the ground for the reception of the seed.

To the rear of the machine is attached the roller G, intended to cover the furrows after the seed has entered them.

The machine is propelled by hand.

Having thus described my invention, what I claim as new, and desire to secure by Letters Patent, is—

The arrangement of the axle H, wheels D D, roller G, plow F, cylinder A, and hopper B, arranged and operated as described, and for the purpose set forth.

ALONZO J. ROGERS.

In presence of—
  I. I. BROWN,
  JOHN L. SHELDEN.